United States Patent [19]

Margalit

[11] 3,981,748
[45] Sept. 21, 1976

[54] NON-AQUEOUS, PRIMARY BATTERY HAVING A BLENDED CATHODE ACTIVE MATERIAL

[75] Inventor: Nehemiah Margalit, Levittown, Pa.

[73] Assignee: ESB Incorporated, Philadelphia, Pa.

[22] Filed: Aug. 14, 1975

[21] Appl. No.: 604,888

[52] U.S. Cl. .............................. 429/164; 429/199; 429/219
[51] Int. Cl.² .......................................... H01M 6/00
[58] Field of Search ............ 136/83 R, 100 R, 6 LN, 136/20, 137, 155

[56] References Cited
UNITED STATES PATENTS

| | | | |
|---|---|---|---|
| 3,658,592 | 4/1972 | Dey | 136/6 LN |
| 3,736,184 | 5/1973 | Dey et al. | 136/83 R X |
| 3,853,627 | 12/1974 | Lehmann et al. | 136/137 X |
| 3,871,915 | 3/1975 | Brych | 136/6 LN |
| 3,925,101 | 12/1975 | Lehmann et al. | 136/100 R |

*Primary Examiner*—John H. Mack
*Assistant Examiner*—C. F. Lefevour
*Attorney, Agent, or Firm*—Anthony J. Rossi

[57] ABSTRACT

A non-aqueous, primary battery having an electrolytic solution consisting essentially of an organic solvent containing an electrolyte salt, a separator, a light metal anode and a blended cathode mix comprising a mixture of silver chromate and a metallic phosphate having a discharge potential in the electrolyte solution higher than silver chromate. The battery preferably has a lithium anode and a non-aqueous electrolyte consisting essentially of methyl formate solvent containing lithium hexafluoroarsenate (LiAsF$_6$) which provides a single voltage plateau for the discharge of silver. Silver phosphate is the preferred metallic phosphate having a discharge potential in the electrolytic solution higher than silver chromate for the silver cation contributes to the capacity of the cell. The electrochemical system of this invention is particularly useful in small primary batteries commonly referred to as "button cells" due to its high volumetric energy density, retention of cell dimensions, and improvement of the rate of discharge characteristic of the silver chromate.

16 Claims, 3 Drawing Figures

LITHIUM/2.0M LiAsF$_6$-METHYL FORMATE/CATHODE
(Room Temperature Discharge, Load-15,000 Ohms)

CELL A CATHODE-PURE Ag$_3$PO$_4$
CELL B CATHODE-60% Ag$_2$CrO$_4$, 40% Ag$_3$PO$_4$
CELL C CATHODE-70% Ag$_2$CrO$_4$, 30% Ag$_3$PO$_4$
CELL D CATHODE-PURE Ag$_2$CrO$_4$

NON-AQUEOUS, PRIMARY BATTERY HAVING A BLENDED CATHODE ACTIVE MATERIAL

BACKGROUND OF THE INVENTION

1. Field of the Invention

This invention relates to a high volumetric energy density battery having a light metal anode, a blended cathode active material and a non-aqueous electrolytic solution. The exothermic reactivity of the anode material with water requires the use of a non-aqueous, organic solvent containing a dissolved salt as the electrolytic solution. The electrochemical system provides a very high volumetric energy density, and it is generally preferred to employ the system in small primary batteries in order to reduce the fire hazard. The invention is not limited to any particular battery size or construction, nor is it limited to any particular anode material or non-aqueous electrolyte.

2. Description of the Prior Art

The prior art discloses many high energy density battery systems which employ a light metal anode in combination with a non-aqueous, organic electrolyte solution. Of particular relevance are U.S. Pat. Nos. 3,658,592 issued to A. N. Dey and 3,736,184 issued to A. N. Dey and R. W. Holmes, both assigned to P. R. Mallory & Co., Inc. and U.S. Pat. Nos. 3,853,627 and 3,871,915, both assigned to Societe des Accumulateurs Fixes et de Traction.

U.S. Pat. No. 3,658,592 discloses a high energy density organic electrolyte battery employing a light metal anode and a metal chromate cathode. The cathode contains a conductive ingredient such as graphite and a polymeric binder such as polytetrafluoroethylene mixed with the metal chromate active material. The cathode composition is molded onto an expanded metal current collector. The patent discloses that the lithium-silver chromate cell had an open circuit voltage of 3.5 and an average operating voltage of 2.4, presumably in an electrolyte solution comprising lithium perchlorate ($LiClO_4$) and tetrahydrofuran (THF).

U.S. Pat. No. 3,736,184 discloses a high energy density, organic electrolyte battery employing a light metal anode and a metal phosphate cathode. The cathode contains a conductive ingredient such as graphite and a polymeric binder such as polytetrafluoroethylene mixed with the metal phosphate active material. The cathode composition is molded onto an expanded metal current collector. The patent discloses that the lithium-silver phosphate cell had an open circuit voltage of 3.5 and an average operating voltage of 2.8, presumably in an electrolyte solution comprising lithium perchlorate dissolved in tetrahydrofuran.

U.S. Pat. No. 3,853,627 issued to Gerard Lehmann and Jean-Paul Gabano discloses a high energy density system employing a lithium anode in which the cathode is selected from silver chromate ($Ag_2CrO_4$) and lead chromate. The preferred electroytic solution comprises lithium perchlorate dissolved in a solvent mixture such as tetrahydrofuran and dimethoxyethane. The cells had an average discharge voltage of 2.95v. across a 9100 ohm resistor and a 3.15v. discharge across a 62,000 ohm resistor. The cathode contained 1% by weight carbon black as a conductor.

U.S. Pat. No. 3,871,915 issued to Alfred Brych discloses a high energy density lithium cell in which the cathode is selected from copper oxide or silver chromate. The preferred electrolyte comprises lithium perchlorate dissolved in a solvent comprising a mixture of a cyclic ether (dioxolane) and a non-saturated cyclic ester (vinylene carbonate). A cell having a silver chromate, graphite, polytetrafluoroethylene cathode and an 80% vinylene carbonate and 20% dioxolane electrolytic solution with a lithium anode had a two voltage plateau discharge across a 300 ohm resistor with voltage plateaus of 3v. and 2.6v.

High energy density, organic electrolyte batteries using lithium-silver phosphate and lithium-silver chromate systems have been investigated, and it has been determined that the silver phosphate active material provides very high volumetric energy density. However, there is a major problem with silver phosphate which expands substantially during discharge causing the battery or cell container to bulge severely. The lithium-silver chromate system causes less cell bulging, however, it has a lower volumetric energy density and a lower operating voltage than the silver phosphate system.

SUMMARY OF THE INVENTION

It is an object of this invention to provide a high volumetric energy density, non-aqueous primary battery having a blended cathode material which discharges at a single operating voltage for the discharge of silver and has a higher discharge rate capability than silver chromate systems. Another object is to provide a non-aqueous, primary battery, particularly of the "button cell" construction, which does not bulge or expand excessively during discharge. A further object of the invention is to provide a non-aqueous, button cell having a cathode active material which does not contain a binder, a conductive ingredient such as graphite or an expanded metal current collector.

It has been discovered that a non-aqueous, primary battery having a blend of silver chromate ($Ag_2CrO_4$) and a metallic phosphate having a discharge potential in the electrolytic solution higher than silver chromate as the cathode active material can be discharged at a single operating voltage of at least about 3 volts for the discharge of silver through a 15,000 ohm load. The blended cathode in combination with a lithium anode and a non-aqueous, organic solvent containing a dissolved salt is a very high volumetric energy density system capable of providing at least about 10 watt-hours/cubic inch (610 watt-hours/cubic decimeter) discharged through a load of 30,000 ohms at room temperature in a cell having a diameter of 0.449 inches (11.40mm) and a cell height of 0.155 inches (3.937mm) as illustrated in FIG. 1. When used in a button cell construction, the blended cathode avoids the problem of excessive expansion of the cathode material during discharge associated with silver phosphate, provided the metallic phosphate content is limited and the discharge rate is carefully controlled. Surprisingly, the blended cathode system yields a rate of discharge capability and an operating silver discharge voltage approaching the silver phosphate system, and the higher voltage is maintained throughout discharge even though there is only a minor amount of metallic phosphate present in the cathode. Silver phosphate is the preferred metallic phosphate for the silver cation contributes to the capacity of the cell. It is believed that this maintenance of the higher silver phosphate voltage is due to an intra-cathode reaction phenomenon which takes place simultaneously with the electrochemical cell reaction and which may be represented by the following reactions:

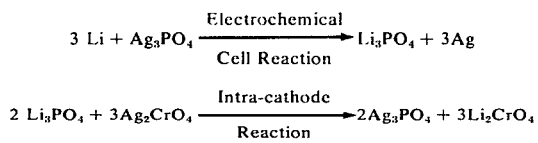

These simultaneous reactions result in a "replenishment" of the silver phosphate active material which is discharged in the electrochemical cell reaction, thereby providing a continuous supply of silver phosphate throughout cell discharge. If a metallic phosphate other than silver is used, there may be some delay before the voltage approaching the silver phosphate voltage is achieved.

These high volumetric energy density systems are particularly useful as power sources for electric watches which require a low drain rate and a battery or cell having a small volume, preferably a button cell. It is also desirable to have a power source having a voltage of approximtely 3 volts which enables one power cell to be used instead of two 1.5 volt cells electrically connected in series. The lithium-silver phosphate system has the required 3 volt power and high volumetric energy density, but the expansion of the silver phosphate precludes its use as a cathode material in button cells, because the small size of the cell accentuates the dimensional changes caused by the discharge of the silver phosphate. The blended silver chromate-metallic phosphate cathode overcomes this expansion problem and still maintaines a higher voltage approaching that of silver phosphate throughout discharge.

It has also been discovered that silver chromate powder and a metallic phosphate powder can be blended to form a homogeneous mix and then compressed into pellets for use in button cells. A polymer binder is not required nor is a conductive ingredient such as graphite present in the cathode. In fact, it is not even necessary to use an expanded metal current collector in the cathode pellet. The elimination of these "non-dischargeable" components substantially increases the electrochemical capacity of the button cells employing a blended cathode in accordance with this invention. However, the use of a binder such as polytetrafluoroethylene, a conductive ingredient such as graphite and-/or a current collector in the blended silver chromate-metallic phosphate cathode is within the scope of this invention.

The above and other objects and advantages of this invention will be more fully described in the description of the preferred embodiment, particularly when read in conjunction with the accompanying drawings which forms a part of this specification.

DESCRIPTION OF PREFERRED EMBODIMENT

Figure 1:
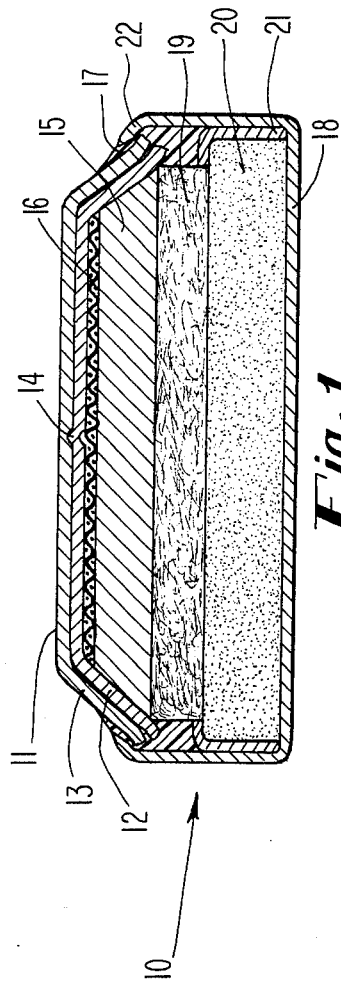
FIG. 1 is a cross-sectional view of the non-aqueous, primary battery of this invention, in completely assembled condition.

This invention comprises a non-aqueous, primary battery having a blend of silver chromate ($Ag_2CrO_4$) and a metallic phosphate as the cathode active material, a light metal anode, a separator between the anode and cathode, and an organic solvent containing a dissolved salt as the electrolytic solution. The battery of this invention can be discharged at a single silver operating voltage despite the presence of two cathode materials of substantially different potential which would be expected to yield two silver voltage plateaus during discharge. Furthermore, when used in a button cell construction, there is no problem of excessive expansion of the cathode material during discharge.

The light metal anodes which may be used in the batteries of this invention are selected from lithium, magnesium, aluminum, beryllium, calcium, sodium and potassium. These metals may be used in their pure metallic state or they may be alloyed with each other or with other metals. For example, the metals can be amalgamated with mercury which reduces local action on the anode surface and thereby increases shelf life and storage capability. These metals may be used in sheet form or as powders, either with or without plastic binders.

The non-aqueous electrolytic solution comprises an organic solvent and a metal salt dissolved therein. Organic solvents compatible with the light metal anodes and the blended cathode include tetrahydrofuran, methyl formate, methyl acetate, ethyl acetate, propylene carbonate, 1, 2 dimethoxyethane alone or mixed with tetrahydrofuran, dioxolane and substitutes thereof, gamma-butyrolactone and dimethyl carbonate, These solvents are merely representative and other organic solvents compatible with the light metal anode and the blended cathode may be used, as well as mixtures of the solvents.

An inorganic salt of a light metal, preferably of the same metal as the anode, is dissolved in the organic solvent to form the electrolytic solution. The inorganic salt is present to provide electrical conductivity to the organic solvent. The metal salts may be selected from perchlorates, hexafluoroarsenates, chloroaluminates, tetrafluoroborates and other salts soluble in the organic solvent and compatible with the anode and the blended cathode. The salts can range in concentration up to saturation, however, preferred concentrations range between about 1 molar to about 3 molar. A particularly preferred electrolytic solution comprises lithium hexafluoroarsenate ($LiAsF_6$) dissolved in methyl formate.

The cathode comprises a blend of silver chromate powder and a metallic phosphate powder, and in button cell constructions, it is preferred that other ingredients not be included in the cathode mix in order to provide the maximum electrochemical capacity. However, if desired, a conductive ingredient such as graphite, carbon, silver, etc. and a plastic binder such as polytetrafluoroethylene may be incorporated into the mix. The metallic phosphate must have a discharge potential in the electrolytic solution higher than silver chromate in order to obtain the higher voltage approaching that of silver phosphate. It is preferred to use silver phosphate for the silver cation contributes to the capacity of the cell. The amount of the metallic phosphate present in the cathode is critical, however, it can be varied over a fairly wide range depending on the discharge rate and the battery construction. It is preferred that there be sufficient metallic phosphate present to provide an operating voltage approaching that of an unblended silver phosphate cathode. When silver phosphate is blended with silver chromate, it is preferred that there be at least about 10% by weight of silver phosphate. Generally the operating voltage of a cell having a blended silver chromate-metallic phosphate cathode mix is slightly less than pure silver phosphate, for example the average operating voltage of a lithium-silver phosphate cell with a methyl formate — $LiAsF_6$ electrolyte discharged through a 15,000 ohm load is 3.2v. and the same cell using a 70% by weight silver chromate — 30% silver phosphate has an average operating voltage of 3.1v. One of the major factors used to determine the amount of silver phosphate which is blended with silver chromate particularly in button cells, is the degree of cell bulging or cathode expansion which can be tolerated. In general it is preferred that the silver chromate content be at least about 50% by weight of the cathode mix.

Another important factor is that the battery with a blended cathode must have a single silver voltage plateau during discharge. This is dependent upon the discharge rate as well as the ratio of the cathode blend, which as previously indicated generally ranges from about 9:1 to 1:1 for silver chromate/silver phosphate blends. It has been found that at lower drain rates (loads of about 100,000 ohms and greater) the phosphate content should be low and at higher drain rates, the phosphate content can be increased and still provide a single silver voltage plateau throughout discharge.

The light metal anode and the blended cathode mix must be separated by a separator material to prevent short circuits. It is generally preferred to use a glass mat material, with one or two layers of the glass mat being effective without unduly impairing the voltage. In some applications it may be desirable to use a special separator material to stop silver migration, such as cellophane, microporous polypropylene, microporous polytetrafluoroethylene, and microporous polysulfide. If this special material is used in combination with a glass mat separator, it is generally preferred to place the glass mat mext to the anode for it functions as an electrolyte absorber which keeps the surface of the anode wet with electrolyte. Unfortunately, it has been found that the special separators for stopping silver migration which have been tested also substantially reduced the cell voltage due to increased internal resistance.

Referring now to FIG. 1, a button cell construction 10 is illustrated, for button cells were selected to evaluate the non-aqueous, primary battery system using a blended cathode mix. These button cells are of the type currently used as a power source for electric watches, an application for which the high voltage, non-aqueous primary batteries are particularly effective.

The anode container 11 comprises what is commonly referred to as a "double top." Two cans are placed in physical, electrical contact with each other with the inner can 12 being nested in the outer can 13 to form a tight friction fit. It is generally preferred to spot weld the cans together as indicated at 14 to maintain permanent electrical contact. The cans may be made from stainless steel which has good corrosion resistance, however, other materials such as nickel-plated steel may be used and the surfaces of the cans may be given special coatings. The "double top" container is preferred for its superior leakage prevention properties, however, a single container can be used and thereby provide more space for electrochemically active material. In order to insure good electrical contact between the inner can 12 and the light metal anode 15 during discharge, a nickel screen 16 or expanded metal may be welded to the can 12. A collar or grommet 17 of suitable plastic such as polyethylene is molded onto the edge of the double top to electrically insulate it from the cathode container 18. The light metal anode 15 may comprise any of the above-listed materials, but it is generally preferred to use lithium. The lithium pellet may be cut or punched from a lithium sheet having a thickness of 0.162 cm. The lithium pellet had a diameter of 0.711 cm.

In the experimental work described in the examples, the separator 19 comprised two layers of 0.025–0.038 cm thick glass mat. One layer had a larger diameter (0.940cm) and was placed against the cathode mix 20, with its edges folded inwardly against the grommet 17. The smaller (0.813 cm) diameter glass mat layer was placed inside the folded edge and in physical contact with the other layer. When the preferred electrolyte ($L9AsF_6$ dissolved in methyl formate) was added to these separator layers and the cell closed, it was difficult for material such as silver to migrate around the edges of the swollen separator layers. The electrolyte volume was 0.10cc, with 0.03cc placed on the cathode pellet and 0.07cc placed on the glass mat separator.

The blended cathode mix 20 was formed by blending metallic phosphate and silver chromate powders in the desired ratio. A cathode mix of 70% by weight silver chromate and 30% by weight silver phosphate was capable of a single silver voltage plateau discharge through a 15,000 ohm load. After thoroughly mixing the powders to get a homogeneous blend, the mix was placed in a pelletizing die and compressed to form a cathode pellet. A force of about 1000 Kg was used to form the cathode pellet which had a height of 0.127cm. and a diameter of 1.02 cm. After the cathode mix pellet 20 was placed in the cathode container 18, a cathode mix ring 21 made from nickel-plated steel was placed around the cathode pellet. The anode container 11 and its components was assembled with the cathode container 18 and its components. The grommet 17 rests upon the cathode mix ring, and the cell is sealed by compressing the upper edge 22 of the cathode container against the grommet 17 with a closing force of about 435 Kg.

EXAMPLE 1

Button cells having the construction illustrated in FIG. 1 were made using a blended cathode mix of 70% by weight $Ag_2CrO_4$ and 30% by weight $Ag_3PO_4$. The anode was a lithium pellet having a 0.711 cm diameter and 0.162cm thickness, and the electrolyte was a 2.0 molar solution $LiAsF_6$ in methyl formate. The separator was two layers of glass mat as described above. The cells were discharged through various loads at 25°C. The following results were recorded:

| Discharge Rate (ohms) | Average Operating Voltage | Capacity to 2.8v. Endpoint (mAhr) |
|---|---|---|
| 3,000 | 2.84v. | 80.4 |
| 7,500 | 2.97v. | 87.4 |
| 15,000 | 3.03v. | 86.5 |

-continued

| Discharge Rate (ohms) | Average Operating Voltage | Capacity to 2.8v. Endpoint (mAhr) |
|---|---|---|
| 100,000 | 3.13v. | 87.1 |
| 300,000 | 3.17v. | 87.1 |

EXAMPLE 2

Button cells identical to those tested in Example 1 were made using a cathode composition of 90% by weight $Ag_2CrO_4$ and 10% by weight of $Ag_3PO_4$. Cells were discharged at room temperature under 100,000 and 400,000 ohm loads, and they were compared to identical cells using a 100% $Ag_2CrO_4$ cathode. Average operating voltage and capacity to a 2.8 volt end point were recorded as follows:

| Cathode | Load (ohms) | Average Operating Voltage | Capacity to 2.8v. End Point (mAhr) |
|---|---|---|---|
| Blend | 100,000 | 3.08v. | 86.8 |
| Blend | 100,000 | 3.11v. | 87.4 |
| Blend | 100,000 | 3.10v. | 87.1 |
| Blend | 400,000 | 3.16v. | 79.0 |
| $Ag_2CrO_4$ | 100,000 | 2.93v. | 77.2 |
| $Ag_2CrO_4$ | 400,000 | 3.06v. | 75.8 |

The cells having the $Ag_2CrO_4$ - $Ag_3PO_4$ blend as the cathode discharged at a single silver voltage plateau higher than the pure $Ag_2CrO_4$ and provided greater capacity when discharged through comparable loads.

EXAMPLE 3

Button cells identical to those tested in Example 1 using a cathode blend of 80% by weight $Ag_2CrO_4$ and 20% by weight $Ag_3PO_4$ were evaluated for elevated temperature storage capability. All cells were discharged at room temperature through a 15,000 ohm load to a 2.7v. end point. Four cells were discharged without elevated storage and three cells were stored for 4 weeks at 130°F. (54°C.) prior to discharge. The following results were recorded:

| | Elevated Storage | Average Operating Voltage | Capacity to 2.7v. (mAhr) |
|---|---|---|---|
| Cell 1 | No | 3.10v. | 88.6 |
| Cell 2 | No | 3.10v. | 88.5 |
| Cell 3 | No | 3.09v. | 88.4 |
| Cell 4 | No | 3.09v. | 88.2 |
| Cell 5 | Yes | 2.92v. | 46.7 |
| Cell 6 | Yes | 2.94v. | 61.1 |
| Cell 7 | Yes | 2.95v. | 56.6 |

All discharges were at a single silver voltage plateau.

EXAMPLE 4

Button cells identical to those tested in Example 1 using a cathode blend of 90% by weight $Ag_2CrO_4$ and 10% by weight $Ag_3PO_4$ were evaluated for elevated temperature storage capability. All cells were discharged at room temperature through a 15,000 ohm load to a 2.8v. end point. Three cells were discharged without elevated storage and one cell was stored for 4 weeks at 130°F. (54°C.) prior to discharge. The following results were recorded:

| | Elevated Storage | Average Operating Voltage | Capacity to 2.8v. (mAhr) |
|---|---|---|---|
| Cell 1 | No | 2.95 | 84.5 |
| Cell 2 | No | 2.95 | 89.3 |
| Cell 3 | No | 2.95 | 84.6 |
| Cell 4 | Yes | 2.99 | 66.9 |

All discharges were at a single silver voltage plateau.

EXAMPLE 5

$Ag_2CrO_4$ — $Ag_3PO_4$ cathode blends were evaluated in an electrolytic solution comprising a 1.5 Molar solution of $LiAsF_6$ dissolved in tetrahydrofuran. The other components and construction were the same as in Example 1. All cells were discharged at room temperature through a 15,000 ohm load. The capacity of the 70% by weight $Ag_2CrO_4$ — 30% by weight $Ag_3PO_4$ blend was measured to a 2.9v. end point, and the capacity of the 60% $Ag_2CrO_4$ — 40% $Ag_3PO_4$ blend was measured to a 2.85 v. end point. The following results were recorded:

| | Blend | Average Operating Voltage | Capacity (mAhr) |
|---|---|---|---|
| Cell 1 | 70/30 | 3.02 | 86.7 |
| Cell 2 | 70/30 | 3.02 | 86.5 |
| Cell 3 | 70/30 | 3.02 | 86.5 |
| Cell 4 | 60/40 | 3.03 | 77.4 |
| Cell 5 | 60/40 | 3.04 | 82.2 |
| Cell 6 | 60/40 | 3.03 | 82.2 |

All discharges were at a single silver voltage plateau.

Figure 2:
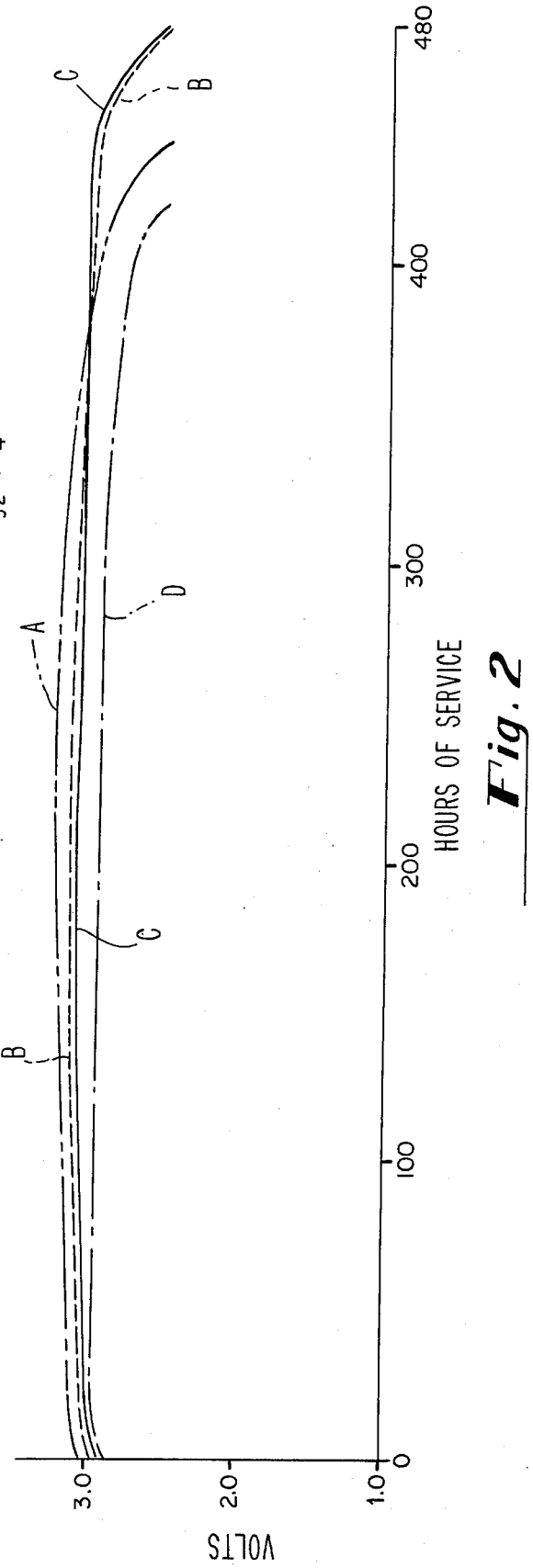
FIG. 2 is a discharge curve for pure $Ag_3PO_4$ and pure $Ag_2CrO_4$ compared to $Ag_2CrO_4$—$Ag_3PO_4$ blends in 2.5M $LiAsF_6$ — Methyl Formate discharged against a Li anode in a button cell.

Referring again to the drawings, FIG. 2 illustrates single silver voltage plateau discharge curves for cells having the construction shown in FIG. 1 employing various cathodes. $Ag_2CrO_4$ — $Ag_3PO_4$ cathode blends were compared to pure $Ag_2CrO_4$ and pure $Ag_3PO_4$ cathodes. The hours of service and the capacities were as follows:

| | Cathode | Hrs. | 2.8 volt End Point Whr/dm$^3$ | Whr/in$^3$ |
|---|---|---|---|---|
| Cell A | $Ag_3PO_4$ | 427 | 679 | 11.1 |
| Cell B | 60/40 | 455 | 687 | 11.3 |
| Cell C | 70/30 | 455 | 680 | 11.1 |
| Cell D | $Ag_2CrO_4$ | 380 | 519 | 8.5 |

The discharge of the blends at a single silver voltage plateau was unexpected, and likewise, the greater hours of service and greater capacity for the cells having the blended cathode.

Figure 3:
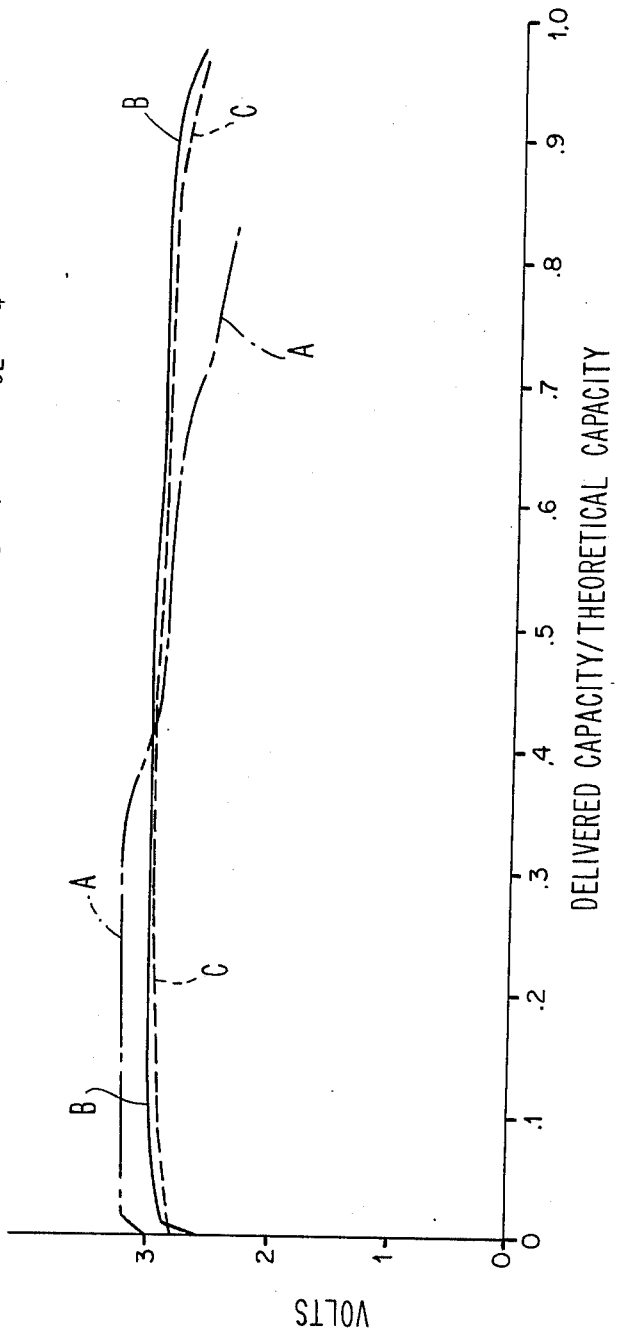
FIG. 3 is a discharge curve for two $Ag_2CrO_4$—$Ag_3PO_4$ blends and a $Ag_2CrO_4$ — $Li_3PO_4$ blend in 2.0M $LiAsF_6$ — Methyl Formate discharged against a Li anode in a button cell.

FIG. 3 illustrates the phenomenon of this invention for a cell in which only 2% by weight of $Li_3PO_4$ was blended with 98% $Ag_2CrO_4$ and provided a single silver voltage plateau approaching the $Ag_3PO_4$ operating voltage. The figure also illustrates a double silver voltage plateau for the cell whose cathode contained 90% $Ag_3PO_4$ and only 10% $Ag_2CrO_4$. The hours of service and the capacities for the cells were as follows:

| | Cathode | 2.8 volt End Point | | |
|---|---|---|---|---|
| | | Hrs. | Whr/dm$^3$ | Whr/in$^3$ |
| Cell A | 90% $Ag_3PO_4$ 10% $Ag_3CrO_4$ | 358 | 557 | 9.1 |

-continued

| Cathode | 2.8 volt End Point | | |
|---|---|---|---|
| | Hrs. | Whr/dm³ | Whr/in³ |
| Cell B  80% Ag$_2$CrO$_4$  20% Ag$_3$PO$_4$ | 456 | 656 | 10.8 |
| Cell C  98% Ag$_2$CrO$_4$  2% Li$_3$PO$_4$ | 409 | 560 | 9.2 |

Cell A had a double silver voltage plateau, whereas Cells B and C had single silver voltage plateaus in accordance with this invention.

Additional experiments with a cell having the construction as illustrated in FIG. 1, using a 2 Molar LiAsF$_6$ — methyl formate electrolytic solution and a 70% Ag$_2$CrO$_4$ — 30% Ag$_3$PO$_4$ cathode blend, indicated that the cell was capable of providing a high rate discharge, whereas a cell having a pure Ag$_2$CrO$_4$ cathode does not have this capability. In fact, the cell with the 70/30 blend was capable of sustaining single pulses of 15MA for 9.5 seconds before the cell voltage fell to 2.3 volts. This high rate discharge capability is a requirement for electric watches having a liquid crystal or light emitting diode display.

Having completely described my invention, I claim:

1. A non-aqueous, primary battery having a light metal anode selected from the group consisting of lithium, magnesium, aluminum, beryllium, calcium, sodium, and potassium, an electrolytic solution consisting essentially of an organic solvent containing a light metal inorganic salt dissolved therein, a separator, and a blended cathode mix comprising a blend of silver chromate and a metallic phosphate having a discharge potential in the electroytic solution higher than silver chromate and capable or reacting with silver ions present in the cathode mix to form silver phosphate, and said battery being characterized by having a single silver voltage plateau throughout discharge.

2. A battery in accordance with claim 1 in which the light metal anode is lithium.

3. A battery in accordance with claim 2 in which the metallic phosphate is lithium phosphate.

4. A battery in accordance with claim 2 in which the metallic phosphate is silver phosphate.

5. A battery in accordance with claim 4 in which the ratio of silver chromate to silver phosphate ranges from about 9:1 to about 1:1.

6. A battery in accordance with claim 5 in which the organic solvent is methyl formate.

7. A battery in accordance with claim 6 in which the light metal inorganic salt is lithium hexafluoroarsenate and the concentration of the salt in the electrolytic solution ranges from about 1 molar to about 3 molar.

8. A battery in accordance with claim 7 characterized by a single silver voltage plateau throughout discharge of at least about 3 volts when discharged through a 15,000 ohm load.

9. A non-aqueous, primary battery of a button cell construction having a light metal anode selected from the group consisting of lithium, magnesium, aluminum, beryllium, calcium, sodium, and potassium, an electrolytic solution consisting essentially of an organic solvent containing a light metal inorganic salt dissolved therein, a separator, and a blended cathode mix comprising a blend of silver chromate and a metallic phosphate having a discharge potential in the electrolytic solution higher than silver chromate and capable of reacting with silver ions present in the cathode mix to form silver phosphate, said cathode mix containing at least about 50% by weight of silver chromate, and said battery being characterized by having a single silver voltage plateau throughout discharge.

10. A battery in accordance with claim 9 in which the light metal anode is lithium.

11. A battery in accordance with claim 10 in which the metallic phosphate is lithium phosphate.

12. A battery in accordance with claim 10 in which the metallic phosphate is silver phosphate.

13. A battery in accordance with claim 12 in which the ratio of silver chromate to silver phosphate ranges from about 9:1 to about 1:1.

14. A batttery in accordance with claim 13 in which the organic solvent is methyl formate.

15. A battery in accordance with claim 14 in which the light metal salt is lithium hexafluoroarsenate and the concentration of the salt in the electrolytic solution ranges from about 1 molar to about 3 molar.

16. A battery in accordance with claim 15 characterized by a single silver voltage plateau throughout discharge of at least about 3 volts when discharged through a 15,000 ohm load.

* * * * *